(12) United States Patent
Ambinder et al.

(10) Patent No.: US 8,241,126 B2
(45) Date of Patent: Aug. 14, 2012

(54) VIDEO GAME CONTROLLER HAVING USER SWAPPABLE CONTROL COMPONENTS

(75) Inventors: Michael S. Ambinder, Bellevue, WA (US); Steven J. Bond, Issaquah, WA (US); Scott Dalton, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 272 days.

(21) Appl. No.: 12/612,578

(22) Filed: Nov. 4, 2009

(65) Prior Publication Data

US 2011/0105231 A1    May 5, 2011

(51) Int. Cl.
*A63F 9/24* (2006.01)
(52) U.S. Cl. .......................................... 463/38
(58) Field of Classification Search ...................... 463/38
See application file for complete search history.

(56) References Cited

U.S. PATENT DOCUMENTS

| 5,913,399 | A  | * | 6/1999  | Takemoto et al. | 194/200 |
| 6,043,615 | A  | * | 3/2000  | Forbes          | 315/291 |
| 2006/0248025 | A1 | * | 11/2006 | Walker et al. | 705/400 |
| 2006/0252511 | A1 | * | 11/2006 | Walker et al. | 463/25 |
| 2009/0054146 | A1 | * | 2/2009  | Epstein et al. | 463/38 |

* cited by examiner

*Primary Examiner* — Pierre E Elisca
(74) *Attorney, Agent, or Firm* — Frommer, Lawrence & Haug LLP; Matthew M. Gaffney

(57) ABSTRACT

A game controller is provided. One or more main control input interfaces on the game controller consist of generalized sockets. A variety of modular input interfaces can be plugged into these sockets. Hardware specific to the input type of the modular input is contained within the modular input itself, and plugged in via an interface. This allows for dual analog sticks, a combination of analog and trackball, or further any combination of touchpad, directional pad, or additional components.

20 Claims, 7 Drawing Sheets

VIDEO GAME CONTROLLER HAVING USER SWAPPABLE CONTROL COMPONENTS

TECHNICAL FIELD

The invention is related to game controllers, and in particular but not exclusively, to a game controller for insertion of swappable modular input components.

BACKGROUND

Gaming devices and computers require an interface through which commands are input. The nature of these inputs necessarily defines the range of commands that the user can give to the system. A game controller is an input device that may be used to provide an input to a video game console, personal computer system, or the like, to control a video game, computer game, or the like. A game controller can be a gamepad, joystick, mouse, keyboard, or any other device designed for gaming that can receive input. Special purpose devices, such as steering wheels for driving games and light guns for shooting games, may also exist for a platform. Some devices, such as keyboards and mice, are generic input devices that can also be used as game controllers.

BRIEF DESCRIPTION OF THE DRAWINGS

Non-limiting and non-exhaustive embodiments of the present invention are described with reference to the following drawings, in which.

DETAILED DESCRIPTION

Figure 1:
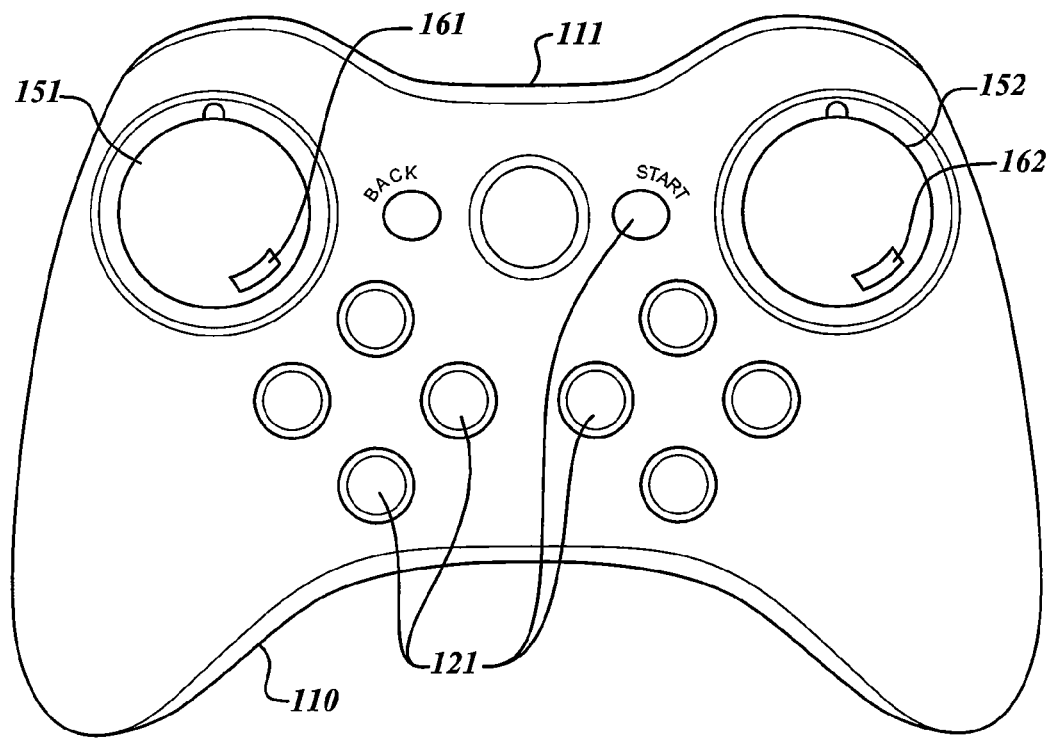
FIG. 1 shows an embodiment of a game controller and embodiments of four modular control inputs.
Figure 1:
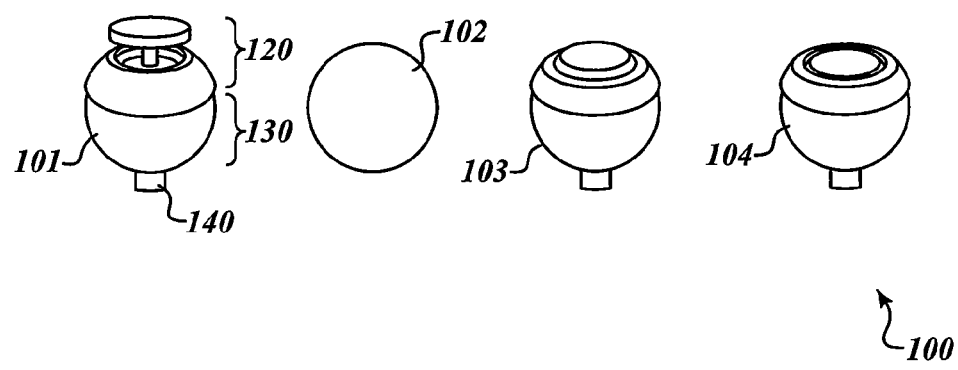

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "signal" means at least one digital, current, voltage, charge, temperature, data, or other signal. The term "coupled" means at least either a direct electrical connection between the items being connected, or an indirect connection through one or more passive or active intermediary devices.

Briefly stated, embodiments of the invention are related to a game controller. One or more main control input interfaces on the game controller consist of generalized sockets. A variety of modular input interfaces can be plugged into these sockets. Hardware specific to the input type of the modular input is contained within the modular input itself, and plugged in via an interface. This allows for dual analog sticks, a combination of analog and trackball, or further any combination of touchpad, directional pad, or additional components.

FIG. 1 shows an embodiment of a game controller kit (100) including a game controller (110) and embodiments of four modular control inputs (101-104). The invention is not limited to these control inputs, and others may also be used. Except for the trackball modular control input 102, each modular control input 101-104 includes a top portion (120), a bottom portion (130), and an interface (140) that is connected to the bottom portion 130. The game controller includes a game controller housing (111), buttons 121 attached to game controller housing 111, socket 151, and socket 152. Socket 151 includes slot 161, and socket 152 includes slot 162.

Socket 151 includes slot 161 which is shaped to allow any of the interfaces 140 access to a first input port (not shown in FIG. 1) inside game controller housing 111. Socket 151 and the first input port are positioned such that slot 161 allows access to the first input port. Similarly, socket 152 includes slot 162 which is shaped to allow any of the interfaces 140 access to a second input port (not shown in FIG. 1) inside game controller housing 111. Socket 152 and the second input port are positioned such that slot 162 allows access to the second input port.

In some embodiments, as shown, both socket 151 and socket 152 are shaped for easy manual insertion and removal of trackball 102. The bottom portion 130 of each of the other modular controls inputs may be shaped substantially the same as a trackball, so that they may also be easily inserted manually and easily removed manually from either socket 151 or socket 152. In this embodiment, the only difference is that the insertion of a modular control input other than trackball 102 additionally involves inserting interface 140 into the slot (slot 161 or slot 162). In other embodiments, the sockets are not trackball-shaped. Although only two sockets 151 and 152 are shown in FIG. 1, in other embodiments, more than two sockets may be employed. In other embodiments, only one socket is employed.

As shown, in some embodiments, socket 151 is symmetrical about itself, and socket 152 is symmetrical about itself. This allows any of the modular input components to be inserted into either socket, and allows the setup to be configured for right or left handedness.

In some embodiments, the placement of the first socket and the placement of the second socket on the game controller housing is symmetrical with respect to each other. In other embodiments, they are not. As shown in FIG. 1, in some embodiments, sockets 151 and 152 may be disposed in the upper left portion and upper right portion, respectively, of the game controller housing. However, in other embodiments, other arrangements may be employed. For example, in some embodiments, socket 151 and 152 may each be disposed in the lower portion of the top half of the game controller housing, or in various other positions in different embodiments. In some embodiments, buttons 121 function in a conventional manner as buttons on a normal gamepad type game controller.

Each of the modular control inputs 101-104 performs a particular input function according to its top portion 120. For example, modular control input 101 is an analog stick. Modular control input 103 is a directional pad. Modular control input 104 is a touchpad. Although only one of each type of input module is shown below, there may be two of some of the different types of inputs, such as two analog stick input controllers 101. In some embodiments, while two analog sticks are inserted, the two analog sticks provide input in a conventional manner as a gamepad type controller with two analog sticks, with each analog stick providing a separate input. Also, more types of input controllers than shown in FIG. 1 may be included, such as an analog or digital joystick, accelerometer input, pressure-sensitive button, microphone, and/or the like. A number of different variables are possible with various modular inputs that may be used, by varying different parameters as follows.

With respect to input type, the input type may be digital input or analog input. Digital input is discretely on or off for any given input. This can be a button press, a direction on a joystick, and/or the like. An analog input is a measure of a degree of input from, for example, 0 to 1. This can be the amount of pressure applied to a button, the amount of movement applied to a particular direction on a joystick, and/or the like.

With respect to mappings, there is relative input, absolute input, rate input, and correlated input. With a relative input control, the current position or amount is treated as an additive/subtractive relative amount to the existing value. With absolute input, the input is mapped to an absolute in terms of position or amount, regardless of the previous value. A touch screen is a good example versus the relative input's pointer. With a rate input, the rate of change of the value of an output is adjusted. With a correlated input, the input directly correlates to the value of the output. The mapping may have zero order controls (position), first order controls (velocity), and second order controls (acceleration).

Another parameter is the degree of freedom, which is the axis on which a particular input may exist. Degree of freedom may apply to rotation and/or translation, depending on the particular type of modular input. Rotation may include relative rotation and/or absolute rotation.

In some embodiments, game controller 111 is a gamepad type controller shaped for use with two hands, and shaped so that socket 151 is positioned for insertion of a modular control input (e.g. 101-104) to be controlled by a user's left thumb, and so that socket 152 is positioned for insertion of a modular control input to be controlled by a user's right thumb, while the user is holding game controller 111 in both hands.

Often controllers have several types of alternate interfaces on the same side, such as an analog stick and directional pad. This design of these types of game controllers is an attempt to provide controls for multiple game types, but such a design may end up unnecessarily complicating control faces with extra controls, since not all of the controls on such a controller can be used simultaneously in this design. Controller 110 eliminates the need for doing this. If a user wishes to use a directional pad, the user can insert directional pad modular input 103 into one of the sockets. If a user does not need a directional pad for the particular game the user is playing, the user may remove the directional pad and replace it with a different modular input, such as an analog stick input 101. This eliminates the need for an unnecessarily complicated control face with extra controls that cannot be used simultaneously.

For example, some gamepad controllers are designed so that the left half of the controller contains both a left analog stick and a directional pad, each of which is designed to be controlled by a user's left thumb while the user holds the gamepad in both hands. However, it is not possible for the user to simultaneously control both the left analog stick and the direction pad with his left thumb. Accordingly, this design presents an unnecessarily complicated control face. In some embodiments of game controller 111, gamepad 110 is designed so that the user inserts either an analog stick in socket 151 or a directional pad in socket 151, depending on which type of input the user wishes to control with his left thumb. In this way, the control face is simplified.

Also of consideration is the operator's preference. Frequently, games provide multiple styles of input based on user preference, but may be fundamentally limited by the capabilities of the input device. On a personal computer, it is possible to have additional devices which fit a variety of purposes, but they are specific devices tailored to a specific purpose and generally not functional outside of that specific set of constraints. Controller 110 allows a single device to be used for a multitude of different types of games. A component of operator preference is handedness. Traditionally, controllers are nonsymmetrical, with a preference for certain inputs on certain sides, creating an inherent handedness to the input scheme. Controller 110 may be easily configurable for right or left handedness.

Traditionally, when playing a game in which the game play involves any sort of in-game camera pivoting or pointer based interface, digital or analog stick based inputs tend to be poor at providing a high precision input. The reasons behind this are that these inputs provide a relative rate input with velocity or acceleration. In order to provide the precision required for small movements, while still allowing for larger movements in a reasonable period of time, the output starts slowly and accelerates over time. Analog inputs allow an additional level of control over digital inputs, allowing the operator to have some control over the degree of output and acceleration. However, in both cases, response time and over/under-steer are common problems. For example, when moving a pointer with a joystick, the user may move the pointer past the intended target by failing to react to the pointer reaching the intended target in time. When addressed within a mouse or trackball input scheme, these inputs provide a relative correlated input which maps more closely to a 1:1 relationship between input and output. However, this style of input is less ideal to providing constant rate inputs and requires clutch/ratcheting operations (for example picking up and re-centering a mouse) to provide continuous input. With controller 110, a trackball input 102 or touchpad input 104 may be inserted for use in the game that features an in-game camera pivoting or pointer based interface, and an analog stick input 101 or directional pad input 103 may be used for constant rate input, or one of each may be used of both types of input are needed, such as inserting analog stick input 101 into one of the two sockets and touchpad input 104 into the other socket.

Embodiments of controller 110 allows for a variety of input styles and operator preferences within a single, input and symmetry agnostic, device through the use of modular components for the main input interfaces. Controller 110 allows for dual analog sticks, a combination of analog and trackball, or further any combination of touchpad, directional pad, or additional components. Controller 100 may be set up based on the intent of the game being played as well as the operator preference. The symmetrical nature allows for this setup to be configured for right or left handedness. The modular nature of the controller allows the removal of legacy control inputs such as replicated analog stick and directional pad allowing for a cleaner design. The controller could also include modular inputs such as specifically gated digital joysticks for fighting games, accelerometer input, microphones, and/or the like.

In some embodiments, game controller 110 is a gamepad-style device that features sockets where the major controller features are usually located (such as where the two analog sticks are located on a conventional gamepad type controller that includes two analog sticks). These sockets allow for the installation or switching of primary control input devices (i.e., control inputs other than the fixed buttons 121). For example, one could swap out an analog stick for a touchpad or a trackball as desired or as per software application requirements. Placement of control inputs into either of two or more sockets makes some embodiments of controller 110 an 'ambidextrous' controller. High resolution ('mouselike') input devices for pointing/looking in a handheld game controller are enabled in the form of trackball and touchpad interfaces.

Each modular input component (e.g., 101-104 is arranged to provide a signal indicating which type of modular control input it is (analog stick, directional pad, touchpad, etc.) via interface 140 when inserted into an input signal. This signal is received at the input port at which the interface 140 is inserted.

Figure 3:
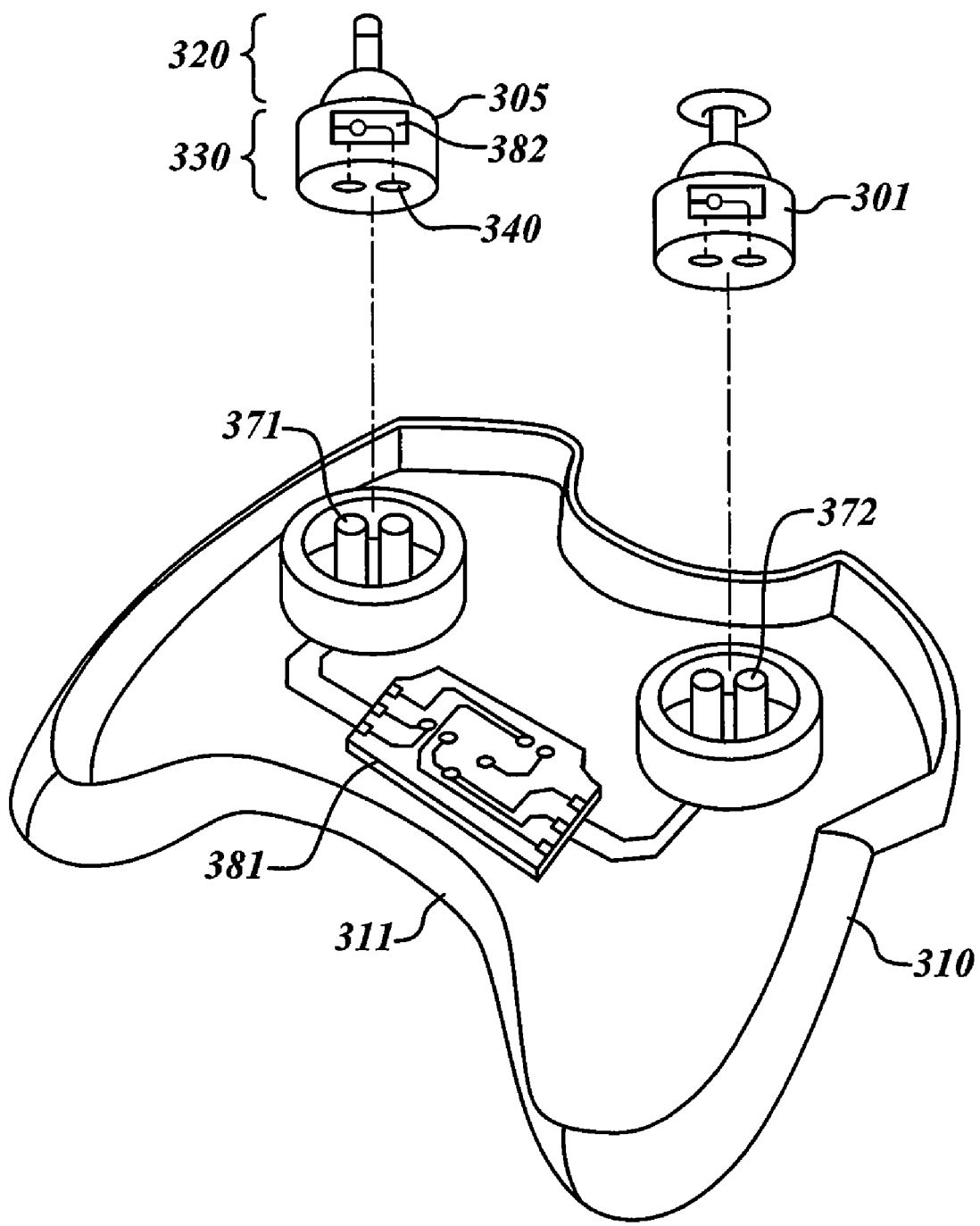
FIG. 3 shows another embodiment of two modular control inputs and another embodiment of the game controller with the top of the game controller housing removed to show components within the game controller.

In FIG. 1, the interfaces 140 are shown as male interfaces, with the input ports as female interfaces. However, in other embodiments the interfaces 140 may be female interfaces with the input ports as male interfaces, as shown in FIG. 3 in one embodiment. Also, although an embodiment of a trackball modular input was discussed as not having an interface in the particular embodiment discussed, in some embodiments, the trackball modular input has an interface.

Although FIG. 1 illustrates an embodiment with two sockets, in some embodiments, there is only one socket, and in other embodiments, there are three or more sockets.

Figure 2:
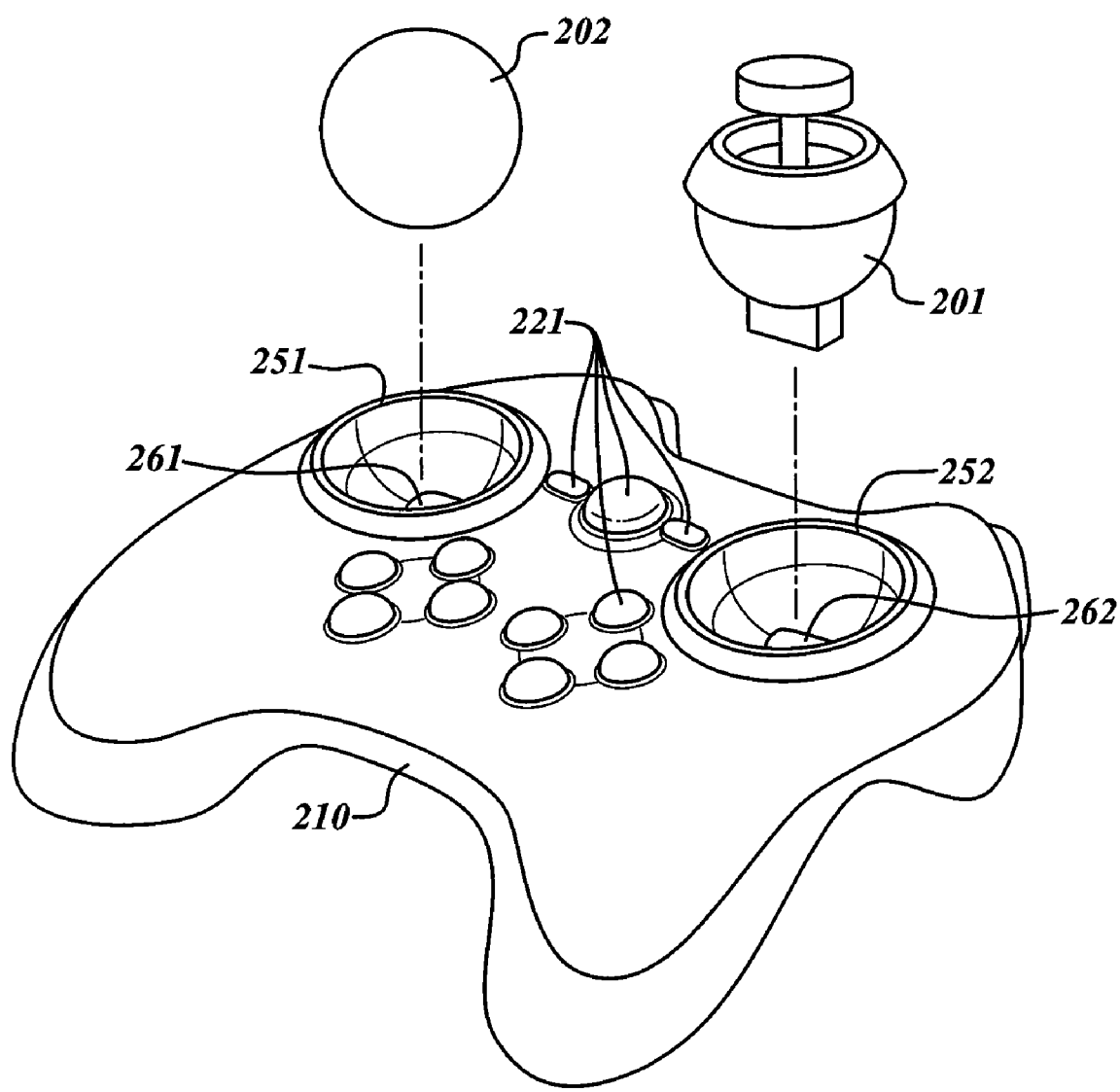
FIG. 2 illustrates another embodiment of the game controller and embodiments of two modular control inputs illustrating insertion of the modular controls inputs.

FIG. 2 illustrates an embodiment of game controller 210 and embodiments of two modular control inputs illustrating insertion of the modular control inputs. Game controller 210 is substantially similar to game controller 110 of FIG. 1, except that the slots 261 and 262 are centrally located in the corresponding socket, 251 and 252 respectively.

FIG. 3 shows another embodiment of two modular control inputs 301 and 305 and an embodiment of game controller 310 with the top of the game controller housing 311 removed. Disposed in game controller housing 311 are input port 371, input port 372, and game controller hardware 381 coupled to input port 371 and input port 372. Each modular control input (301 and 305) includes a top portion 320, a bottom portion 330, an interface 340 connected to the bottom portion, and control input hardware 382 disposed inside the bottom portion 330 and coupled to interface 340. In some embodiments, control input hardware 382 is arranged to provide a signal indicating which type of modular control input it is (analog stick, directional pad, touchpad, etc.). Control input hardware 382 is further arranged to convert actions performed on top portion 320 into data. The type of data depends on the type of modular control input. For example, an analog stick communicates at least displacement and direction.

When the control input (e.g. 301 or 305) is inserted in game controller 310, the data from the control input hardware 382 is communicated to game controller hardware 381 via the connection between interface 340 and the input port (371 or 372) (the input ports 371 and 372 are in turn coupled to game controller hardware 381). Game controller hardware 381 and control input hardware 382 may each include a microprocessor loaded with software to perform the corresponding functions, embedded systems, digital and/or analog circuitry, logic, and/or the like. In some embodiments, game controller hardware 381 is arranged to receive the signal provided by control input hardware indicating which type of modular control input has been inserted, and game controller hardware 381 is configured for automatic configuration to receive input for the indicated type of modular input component inserted. Game controller hardware 381 is arranged to communicate the data from the control input hardware 382 to the game console, computer system, or the like being used, after possibly performing further operations on the data as needed according to the particular game input, gaming device, and game being used at the time. If game controller 310 is connected to a game console, the communication may be similar to that of a conventional gamepad, to ensure compatibility, depending on the type of modular input attached—if an analog stick is attached to a gaming console, game controller 310 may communicate information related to the user's manipulation of the analog stick (e.g., displacement and direction) to the gaming console in the same manner that information from a game pad with an analog stick normally provides such information to the game console. If game controller 310 is connected to a computer, game controller hardware 311 may need to convert the input into a mouse-and-keyboard type input in some embodiments. In addition, if game controller hardware 311 is restricted in the types of inputs it may receive, it may convert incompatible input from game controller 310 and control input hardware 381 into a compatible input.

As previously discussed, the first socket (e.g. socket 151 of FIG. 1) is attached to the game controller housing, and the first socket (e.g. 151) includes a first slot (e.g. 161) that is shaped to allow access to the first input port 371, and wherein the first socket and first input port 371 are positioned such that the first slot allows access to the first input port 371. Similarly, the second socket (e.g. socket 152 of FIG. 1) is attached to the game controller housing, and the second socket (e.g. 152) includes a second slot (e.g. 162) that is shaped to allow access to the second input port 372, and wherein the second socket and second input port 372 are positioned such that the second slot allows access to the second input port 372.

Figure 4:
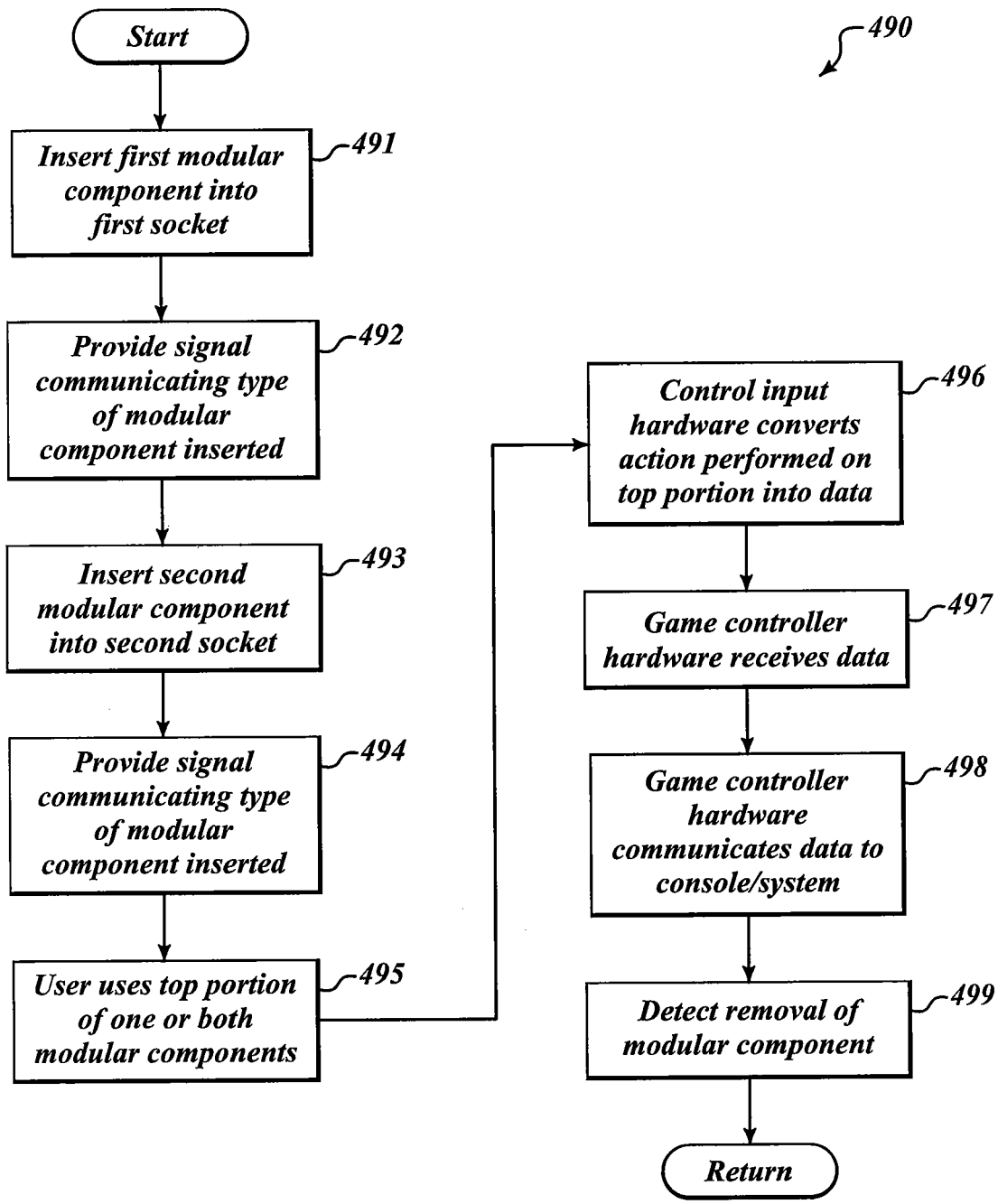
FIG. 4 illustrates a flow chart of an embodiment of a process.

FIG. 4 illustrates a flow chart of an embodiment of a process (490) that may be employed by game controller 310 of FIG. 3. After a start block, the process proceeds to block 491, where a first modular component is inserted into the first socket. As previously discussed, the modular component selected for the first slot may be based on a number of different factors, including the type of game being played, operator's preference, and/or the like. The process then proceeds to block 492, where the input control hardware of the first modular input provides a signal indicating which type of modular component it is. The signal is communicated to the game control hardware. The information about the type of modular components inserted is communicated to the game console or computer in some embodiments, which may or may not take advantage of the information. In some embodiments, the game controller hardware automatically configures itself for receiving input for the indicated type of modular input upon receiving this signal. For example, if an analog stick is inserted, the game controller hardware may indicate to the console or computer that an analog stick was inserted, and prepare to receive analog or digital input associated with an analog stick, including at least displacement and direction. As a different example, if a directional pad is inserted instead, the game controller hardware instead automatically configures itself to receive data that indicates direction only.

The process then moves to block 493, where the second modular component is inserted in the second socket. The process then proceeds to block 494, where the input control hardware of the second modular circuit provides a signal indicating which type of modular component it is. The signal is communicated to the game control hardware. The game controller hardware may then prepare to receive appropriate inputs for that type of input. Blocks 493 and 494 are optional, as a modular input need not be inserted in the second socket, and in some embodiments there is only one socket. The process then advances to block 495, where the user uses the top portion of one or both of the modular components to provide an input to the game. For example, the user may move a directional pad to the right to move an icon or character in the game to the right.

The process then proceeds to block 496, where the control input hardware in the modular input that the user uses converts action(s) performed on the top portion of the modular control into data. The process then moves to block 497, where the game controller receives the data. The process then advances to block 498, where the data is communicated to the game console, personal computer, or the like to which the game controller is being used to provide commands. The process then proceeds to block 499, where removal of a modular control input is detected. This information is transmitted to the game console or computer in some embodiments, which may or may not take advantage of the information. The process then proceeds to a return block, where other processing is resumed.

Figure 5:
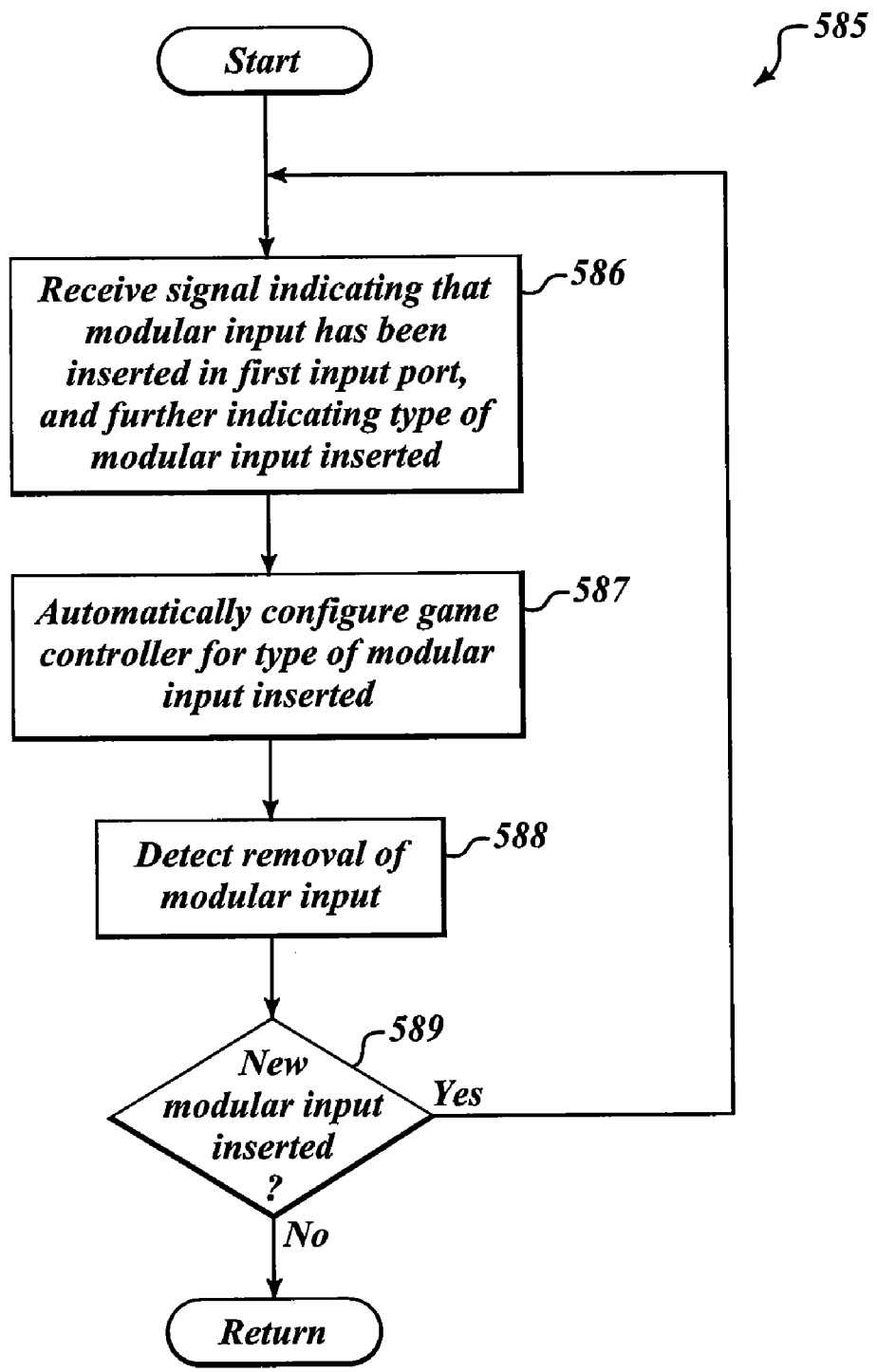
FIG. 5 shows a flow chart of an embodiment of another process.

FIG. 5 illustrates a flow chart of an embodiment of another process (585) that may be employed by game controller 310 of FIG. 3. After a start block, the process proceeds to block 586, where a signal is received indicating that a modular input has been inserted in the first input port of the game controller, and further indicating the type of modular input inserted. For example, this signal may be provided by the input component hardware in the modular input inserted and communicated to the game controller hardware, as previously discussed. The process then moves to block 587, where the game controller is automatically configured for the type of modular input that was inserted into the first input port in step 586.

The process then advances to block 588, where removal of the modular input is detected. The process then proceeds to decision block 589, where a determination is made as to whether a new modular input has been inserted into the first input port. If not, the process moves to a return block, where other processing is resumed. If, however, the determination at decision block 589 is positive, the process returns to block 586, where the process is repeated with the new modular input that has been inserted in the first input port.

Although not shown, a similar process to process 585 may also be applied to the one or more additional input ports on the game controller, for embodiments in which one or more additional input ports are present on the game controller.

Figure 6:
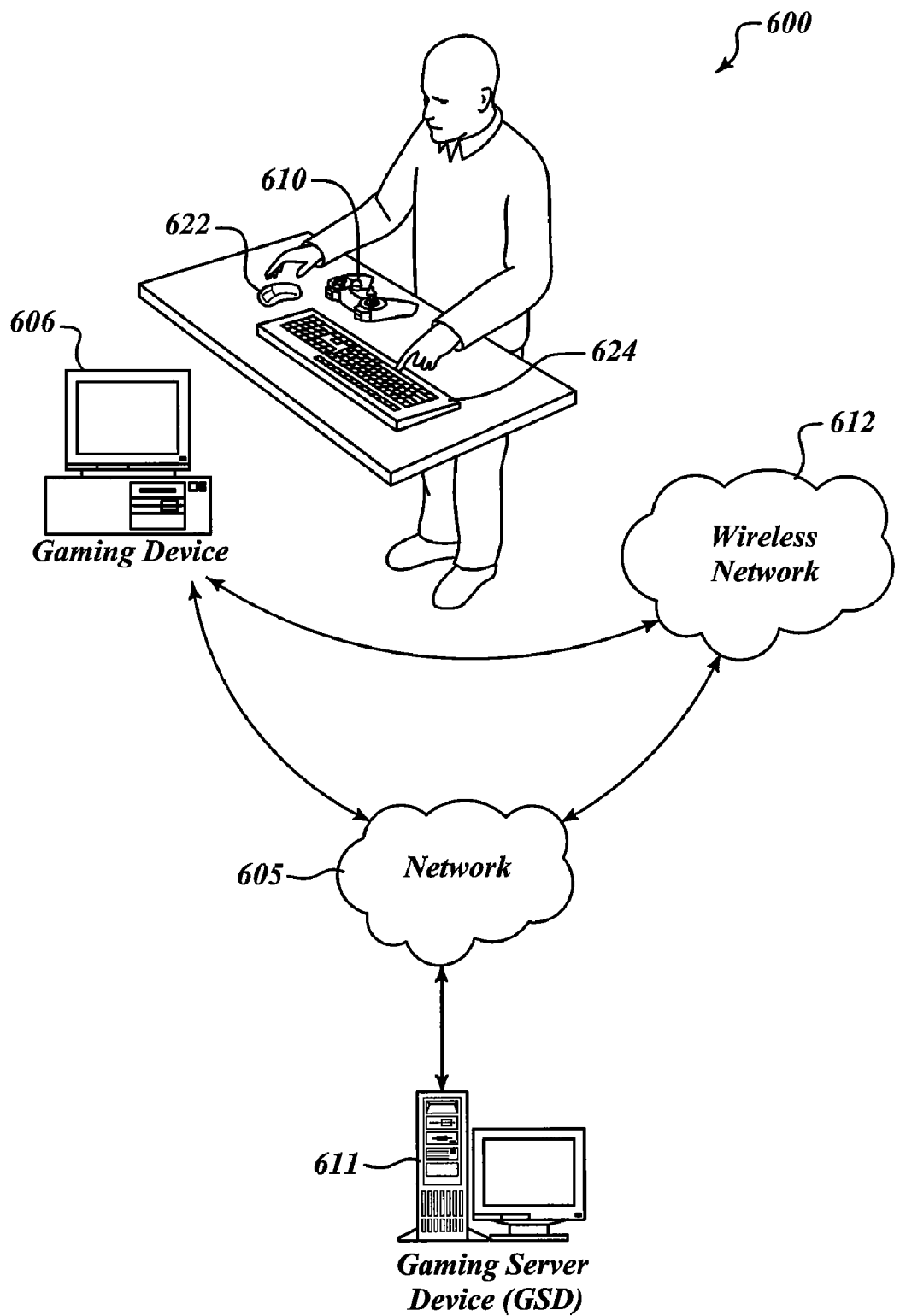
FIG. 6 illustrates an illustrative operating environment for the game controller of FIG. 1, 2, or 3.

FIG. 6 illustrates a block diagram generally showing an overview of one embodiment of a system in which the present invention may be practiced. System 600 may include many more components than those shown in FIG. 6. However, the components shown are sufficient to disclose an illustrative embodiment for practicing the present invention. As shown in the figure, system 600 includes wireless network 612, gaming device 606, game server device (GSD) 611, game controller 610, keyboard 624, mouse 622, and local area networks ("LANs")/wide area networks ("WANs")–(network) 605.

Gaming device 606 may be a game console, personal computer, or the like. One embodiment of a personal computer usable as gaming device 606 is described below. Gaming device 606 may include virtually any device capable of receiving input from game controller 610. In some embodiments, gaming device 606 may be capable of connecting to wireless network 612. Such devices include portable devices such as, radio frequency (RF) devices, infrared (IR) devices, Personal Digital Assistants (PDAs), game consoles, handheld computers, laptop computers, wearable computers, tablet computers, integrated devices combining one or more of the preceding devices, or the like. In one embodiment, gaming device 606 is capable of connecting using a wired communications medium, such as network 605, such as personal computers, multiprocessor systems, microprocessor-based or programmable consumer electronics, network PCs, or the like. Thus, in one embodiment, gaming device 606 may be configured to operate over a wired and/or a wireless network.

Gaming devices 606 typically range widely in terms of capabilities and features. For example, a handheld device may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Gaming device 606 also may include at least one application that is configured to receive content from another computing device. The application may include a capability to provide and receive textual content, multimedia information, components to a computer application, such as a video game, or the like. The application may further provide information that identifies itself, including a type, capability, name, or the like. In one embodiment, gaming device 606 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Gaming device 606 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed. Thus, in one embodiment, gaming device 606 may enable users to participate in one or more messaging sessions, such as a chat session, a gaming session with messaging, or the like. Such messaging sessions may be text oriented, in that the communications are achieved using text. However, other messaging sessions may occur using gaming device 606 that employ other mechanisms to communicate, include, but not limited to audio, graphics, video, and/or a combination of text, audio, graphics, and/or video.

Game controller 610, keyboard 624, and mouse 622 are configured to provide input to gaming device 606. Game controller 610, keyboard 624, and mouse 622 may have either a wired connection, wireless connection, or both to gaming device 606. Game controller 610 has at least one socket that includes a slot that is shaped to allow access to an input port disposed inside game controller 610, as discussed above. Although keyboard 624 and mouse 622 are shown in FIG. 1, some embodiments of game controller 610 have modular inputs that allow games to be played without use of a keyboard or mouse, as discussed in greater detail above.

Wireless network 612 is configured to couple gaming device 606 with network 605. Wireless network 612 may include any of a variety of wireless sub-networks that may further overlay stand-alone ad-hoc networks, or the like, to provide an infrastructure-oriented connection for gaming device 606. Such sub-networks may include mesh networks, Wireless LAN (WLAN) networks, cellular networks, or the like.

Wireless network 612 may further include an autonomous system of terminals, gateways, routers, or the like connected by wireless radio links, or the like. These connectors may be configured to move freely and randomly and organize themselves arbitrarily, such that the topology of wireless network 612 may change rapidly.

Wireless network 612 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as gaming device 606 with various degrees of mobility. For example, wireless network 612 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 612 may include virtually any wireless communication mechanism by which information may travel between gaming device 606 and another computing device, network, or the like.

Network 605 is configured to couple computing devices, such as GSD 611 to other computing devices, including potentially through wireless network 612 to gaming device 606. However, as illustrated, gaming device 606 may also be connected through network 605 to GSD 611. In any event, network 605 is enabled to employ any form of computer readable media for communicating information from one electronic device to another. Also, network 605 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 605 includes any communication method by which information may travel between computing devices.

GSD 611 may include any computing device capable of connecting to network 605 to enable a user to participate in one or more online games, including, but not limited multi-player games, as well as single player games.

Devices that may operate as GSD 611 include personal computers, desktop computers, multiprocessor systems, video game consoles, microprocessor-based or programmable consumer electronics, network PCs, server devices, and the like.

Moreover, although GSD 611 is illustrated as a single network device the invention is not so limited. For example, one or more of the functions associated with GSD 611 may be implemented in a plurality of different network devices, distributed across a peer-to-peer system structure, or the like, without departing from the scope or spirit of the invention.

Although gaming device 606 is shown as connected to a network, the invention is not so limited, and gaming device 606 may operate without being connected to a network, and in some embodiments does not have the ability to connect to a network.

Figure 7:
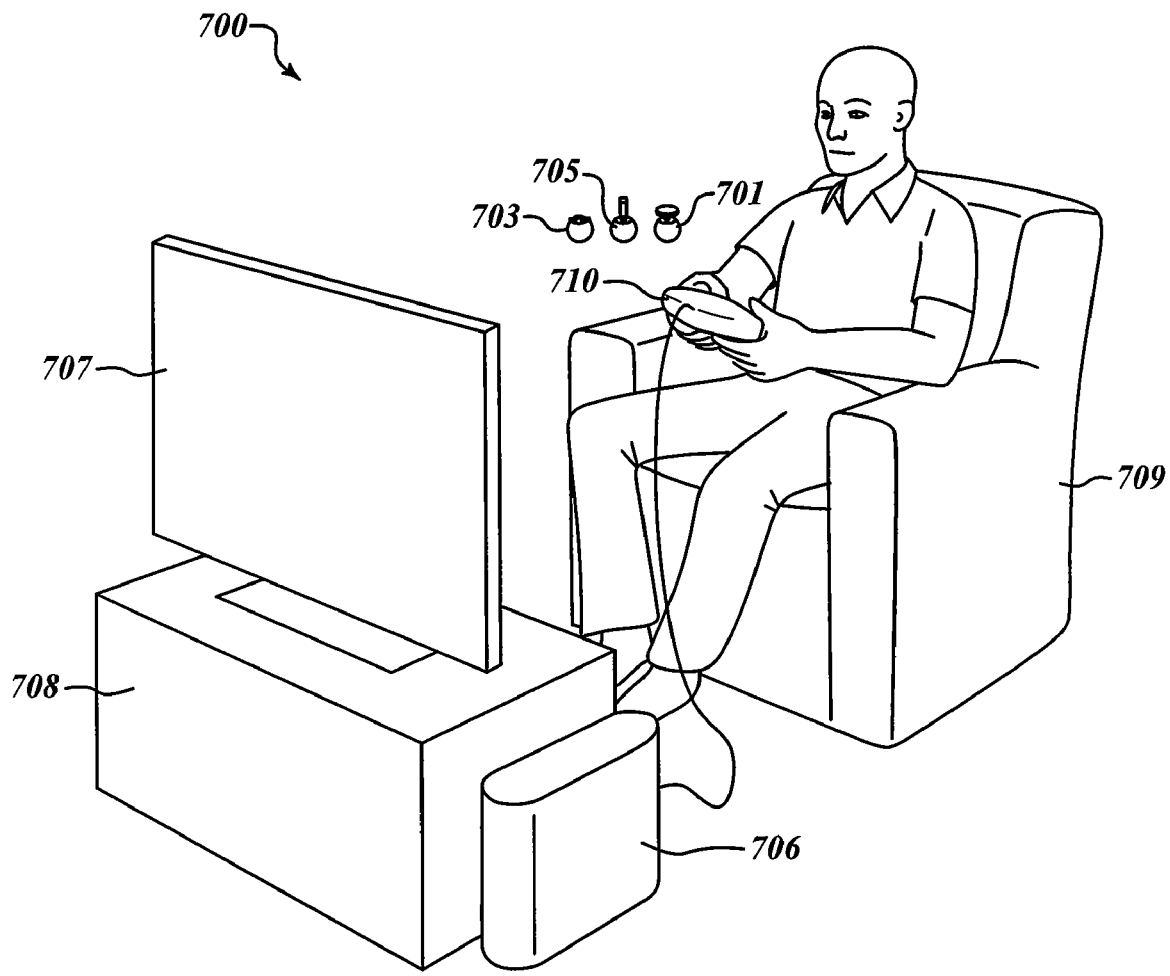
FIG. 7 illustrates a block diagram generally showing a typical gaming environment in which the present invention may be practiced, in accordance with aspects of the present invention.

FIG. 7 illustrates a block diagram generally showing a typical gaming environment (700) in which the present invention may be practiced. Gaming environment 700 includes modular controller 710; modular inputs 701, 703, and 705; game console 706; display 707; optional display stand 708; and optional chair 709. Embodiments of a game console such as game console 706 have been discussed in greater detail above. Game console 706 may be used for playing one or more games, in which the user provides input for playing the game or games via game controller 710. In FIG. 7, modular controller 710 is shown connected in a wired manner to game console 706, but it may also be connected to game console 706 wirelessly, or the like. Modular inputs 701, 703, and 705, and/or others, may be swapped in or out of modular controller 710, as discussed in greater detail above. Game console 706 may provide video and/or audio output via display 707, which may be a television, monitor, or the like. Optionally, a display stand 708 may be used for convenient positioning of display 707, and chair 709 may optionally be used for comfortable seating of the user.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A game controller, comprising:
   a game controller housing;
   game controller hardware disposed inside of the game controller housing, wherein the game controller hardware is coupled to a first input port; the game controller hardware is configured to receive, at the first input port, a signal indicating which type of modular input component is inserted in the first port; and wherein the game controller hardware is further configured for automatic configuration to receive input for the indicated type of modular input component inserted; and
   a first socket attached to the game controller housing, wherein the first socket includes a first slot that is shaped to allow access to the first input port, and wherein the first socket and the first input port are positioned such that the first slot allows access to the first input port.

2. The game controller of claim 1, wherein the first socket is shaped such that the first socket is suitable for manual insertion and removal of a trackball.

3. The game controller of claim 1, wherein
the game controller hardware is arranged to receive data from a modular input component insertable into the first socket, and is further arranged to communicate the data to at least one of a console or a computer system.

4. The game controller of claim 1, wherein
the game controller hardware is further configured to detect when a modular control input has been removed from the first socket.

5. The game controller of claim 1, wherein
the game controller is shaped as a gamepad for use with two hands.

6. The game controller of 1, further comprising;
a first modular input component that is inserted in the first socket.

7. The game controller of claim 6, wherein
the first modular input component is at least one of a trackball, an analog stick, touchpad, directional pad, or digital joystick.

8. The game controller of claim 6, wherein
the first modular input component is at least one of a trackball or a touchpad.

9. The game controller of claim 6, wherein
the first modular component includes an interface that is inserted in the first input port of the game controller hardware via the first slot.

10. A game controller, comprising:
a game controller housing;
game controller hardware disposed inside of the game controller housing, wherein the game controller hardware is coupled to a first input port; the game controller hardware is configured to receive, at the first input port, a signal indicating which type of modular input component is inserted in the first port; and wherein the game controller hardware is further configured for automatic configuration to receive input for the indicated type of modular input component inserted; and
a first socket attached to the game controller housing, wherein the first socket includes a first slot that is shaped to allow access to the first input port, and wherein the first socket and the first input port are positioned such that the first slot allows access to the first input port; and
a second socket attached to the game controller housing, wherein the second socket includes a second slot that is shaped to allow access to the second input port, and wherein the second socket and the second input port are positioned such that the second slot allows access to the second input port.

11. The game control ter of claim 10, wherein
the game controller is shaped as a gamepad for use with both hands;
the first socket is positioned for insertion of a first modular input component to be controlled by a left thumb of a user while the game controller is held in both hands; and
the second socket is positioned for insertion of a second modular input component to be controlled by a right thumb of the user while the game controller is held in both hands.

12. The game controller of claim 10, wherein
the first socket is symmetrical about itself, and the second socket is symmetrical about itself.

13. The game controller of claim 10, wherein
the placement of the first socket and the placement of the second socket on the game controller housing is symmetrical with respect to each other.

14. The game controller of claim 10, wherein
the game controller hardware is arranged to receive a signal at the first input port indicating which type of modular input component is inserted in the first port, and wherein the game controller hardware is further arranged to receive another signal at the second input port indicating which type of modular input component is inserted in the second input port.

15. The game controller of 10, further comprising:
a first modular input component that is inserted in the first socket; and
a second modular input component that is inserted in the second socket.

16. A modular control input for insertion into a game controller, comprising:
a top portion that includes at least one of an analog stick, touch pad, directional pad, or digital joystick;
a bottom portion, wherein the bottom portion is shaped for insertion in a symmetrical socket;
control input hardware that is arranged to convert actions performed on the top portion into data, and wherein the control input hardware is arranged to provide a signal that indicates which type of modular control the modular control input is; and
an interface connected to the bottom portion, wherein the interface is arranged for insertion into an input port, and wherein the interface is coupled to the control input hardware.

17. The modular control input of claim 16, wherein
the control input circuit is arranged to communicate data to game control hardware in a game controller.

18. A method for game input, comprising:
at a first time, receiving a signal indicating that a modular input has been inserted in a first input port of a game controller, and further indicating a type of modular input that has been inserted into the first input port of the game controller at the first time;
automatically configuring the game controller to receive input for the indicated type of modular input inserted at the first time;
detecting removal of the modular input from the first input port of the game controller;
at a second time, receiving another signal indicating that another modular input has been inserted in the first input port of the game controller, and further indicating a type of modular input that has been inserted into the first input port of the game controller at the second time; and
automatically configuring the game controller to receive input for the indicated type of modular input inserted at the second time.

19. The method of claim 18, further comprising:
communicating data related to actions performed on the modular input based on the type of modular input that is inserted in the first input port.

20. The method of claim 18, further comprising:
receiving a signal indicating that yet another modular input has been inserted in a second input port of the game controller, and further indicating the type of modular input that has been inserted into the second input port.

* * * * *

UNITED STATES PATENT AND TRADEMARK OFFICE
CERTIFICATE OF CORRECTION

| | |
|---|---|
| PATENT NO. | : 8,241,126 B2 |
| APPLICATION NO. | : 12/612578 |
| DATED | : August 14, 2012 |
| INVENTOR(S) | : Michael S. Ambinder et al. |

It is certified that error appears in the above-identified patent and that said Letters Patent is hereby corrected as shown below:

In column 8, line 40, delete "(SMGL)," and insert -- (SGML), --, therefor.

In column 11, line 19, in Claim 6, delete "1," and insert -- claim 1, --, therefor.

In column 11, line 19, in Claim 6, delete "comprising;" and insert -- comprising: --, therefor.

In column 11, line 55, in Claim 11, delete "control ter" and insert -- controller --, therefor.

In column 12, line 14, in Claim 15, delete "10," and insert -- claim 10, --, therefor.

Signed and Sealed this
Thirteenth Day of November, 2012

David J. Kappos
*Director of the United States Patent and Trademark Office*